(12) United States Patent
Kamigaito et al.

(10) Patent No.: US 11,954,432 B2
(45) Date of Patent: Apr. 9, 2024

(54) SYMBOL SEQUENCE GENERATION APPARATUS, TEXT COMPRESSION APPARATUS, SYMBOL SEQUENCE GENERATION METHOD AND PROGRAM

(71) Applicant: NIPPON TELEGRAPH AND TELEPHONE CORPORATION, Tokyo (JP)

(72) Inventors: Hidetaka Kamigaito, Tokyo (JP); Masaaki Nagata, Tokyo (JP); Tsutomu Hirao, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 884 days.

(21) Appl. No.: 16/976,932

(22) PCT Filed: Feb. 14, 2019

(86) PCT No.: PCT/JP2019/005283
§ 371 (c)(1),
(2) Date: Aug. 31, 2020

(87) PCT Pub. No.: WO2019/167642
PCT Pub. Date: Sep. 6, 2019

(65) Prior Publication Data
US 2021/0012069 A1  Jan. 14, 2021

(30) Foreign Application Priority Data

Mar. 2, 2018  (JP) .................................. 2018-037919

(51) Int. Cl.
*G06F 40/20* (2020.01)
*G06F 40/47* (2020.01)
*G06N 3/04* (2023.01)

(52) U.S. Cl.
CPC .............. *G06F 40/20* (2020.01); *G06F 40/47* (2020.01); *G06N 3/04* (2013.01)

(58) Field of Classification Search
CPC ........ G06F 40/20; G06F 40/47; G06F 40/284; G06F 40/30; G06F 16/00; G06F 16/30;
(Continued)

(56) References Cited

U.S. PATENT DOCUMENTS 10,229,111 B1 * 3/2019 Filippova ................. G06F 40/42
2015/0248608 A1 * 9/2015 Higgins .................. G06N 3/088
706/16
(Continued)

OTHER PUBLICATIONS

Filippova, Katja, et al., "Sentence Compression by Deletion with LSTMs" Proceedings of the 2015 Conference on Empirical Methods in Natural Language Processing, pp. 360-368, Lisbon, Partugual, Sep. 17-21, 2015, Association for Computational Linguistics.
(Continued)

*Primary Examiner* — Michael N Opsasnick

(57) ABSTRACT

This disclosure relates to a method of generating a symbol string based on an input sentence represented by a sequence of symbols. In particular, the method involves receiving an input symbol string representing a sentence, generating, using a neural network based on a sequence of dependency structure of elements in the input symbol string, an output symbol string corresponding to the input sentence. The neural network includes an encoder that converts elements of the input symbol string to a first hidden state in a form of a multi-dimensional vector, an attention mechanism that applies a weight to the first hidden state and generates the weighted first hidden state as a second hidden state, a decoder that generates a third hidden state based on at least one element of the input symbol string, an element of the output symbol string, and the second hidden state, and an output generator that generates an element of the output (Continued)

symbol string based on the second hidden state and the third hidden state. The output symbol string may represent a sequence of labels to process the input sentence.

20 Claims, 10 Drawing Sheets

(58) Field of Classification Search
CPC .......... G06F 40/56; G06N 3/04; G06N 3/044; G06N 3/045; G06N 3/08
See application file for complete search history.

(56) References Cited

U.S. PATENT DOCUMENTS

| 2015/0363688 | A1* | 12/2015 | Gao | G06N 3/045 706/27 |
| 2018/0157643 | A1* | 6/2018 | Andrassy | G06N 3/045 |
| 2019/0265955 | A1* | 8/2019 | Wolf | G06F 11/36 |

OTHER PUBLICATIONS

Wang, Liangguo, et al., "Can Syntax Help? Improving an LSTM-based Sentence Compression Model for New Domains," Porceedings of the 55th Annual Meeting of the Association for Computational Linguistics, pp. 1385-1393, Vancouver, Canada, Jul. 30-Aug. 2017, https://doi.org/10.18653/v1/P17-1127.

Katsuhiko, Uegakigaieigobayashi, et al., "Neural Statement Compression Considering Chain of Dependent Structures," The Association for Natural Language Processing 2018, Mar. 12, 2018, pp. 1096-1099.

* cited by examiner

SYMBOL SEQUENCE GENERATION APPARATUS, TEXT COMPRESSION APPARATUS, SYMBOL SEQUENCE GENERATION METHOD AND PROGRAM

TECHNICAL FIELD

This application is a U.S. 371 Application of International Patent Application No. PCT/JP2019/005283, filed on 14 Feb. 2019, which application claims priority to and the benefit of JP Application No. 2018-037919, filed on 2 Mar. 2018, the disclosures of which are hereby incorporated herein by reference in their entireties.

BACKGROUND ART

Methods called sentence compression have hitherto been researched in the field of natural language processing. Sentence compression is a method of generating a shorter sentence (compressed sentence) from an original while preserving the gist of the compression object sentence (original). More specifically, sentence compression generates a compressed sentence shorter than the original by giving a label to each of the words present in the original indicating whether or not the word should be deleted or retained and by deleting the words that were given the label indicating deletion.

For example, let us assume that the following sentence is given as the original: "Pakistan signed a resolution on Monday to import 1300 MW of electricity", as shown in FIG. 1. In this case, sentence compression gives each of the words in the original a label indicating deletion or retention and deletes the words that were given the label indicating deletion, thus generating a compressed sentence made up only of the words that were given the label indicating retention. Thus, a compressed sentence shorter than the original: "Pakistan signed a resolution to import 1300 MW of electricity" is obtained, as shown in FIG. 1.

Sentence compression methods that use Sequence-to-Sequence (a probability model for converting an input symbol sequence into another symbol sequence, also expressed as "Seq2Seq") for guaranteeing the readability of the compressed sentence have hitherto been known (NPL 1). Another sentence compression method that combines syntax trees and Seq2Seq has also been known (NPL 2). The sentence compression method disclosed in NPL 2 uses LSTM (Long short-term memory) to give weights (probability values) to respective words in an original for the probability of being adopted in a compressed sentence, and trims the dependency structure tree representing the dependency relations between words such as to maximize the sum of these weights, whereby a higher compression performance than the sentence compression method disclosed in NPL 1 is realized.

PRIOR ART LITERATURE

Non Patent Literature

[NPL 1] Katja Filippova, Enrique Alfonseca, Carlos A. Colmenares, Lukasz Kaiser, and Oriol Vinyals "Sentence Compression by Deletion with LSTMs". In Proceedings of the 2015 Conference on Empirical Methods in Natural Language Processing, pp. 360-368.

[NPL 2] Liangguo Wang, Jing Jiang, Hai Leong Chieu, Chen Hui Ong, Dandan Song, and Lejian Liao. "Can syntax help? improving an lstm-based sentence compression model for new domains". In Proceedings of the 55th Annual Meeting of the Association for Computational Linguisti cs (Volume 1: Long Papers), pp. 1385-1393.

SUMMARY OF THE INVENTION

Technical Problem

Since the sentence compression method disclosed in NPL 2 is a method that deletes words successively from the leaf nodes of the dependency structure tree, if there is an important word in a node close to a leaf of the dependency structure tree, but if this word is distanced from the root (i.e., located deep), it was difficult to make this word remain in a compressed sentence.

For example, let us assume that the following sentence is given as the original: "Pakistan signed a resolution on Monday to import 1,300 MW of electricity from Kyrgyz Republic and Tajikistan ( . . . )", as shown in FIG. 2. The arrows shown in FIG. 2 indicate the dependency relations between words. In the dependency structure tree, each word has a parent that it modifies. For example, in the example shown in FIG. 2, the word "signed" and the word "resolution" have a dependency relation. In the dependency structure tree, the word "signed" is the parent and the word "resolution" is the child.

The example shown in FIG. 2 is a sentence relating to an agreement on electricity import, in which names of nations are important. Therefore, in order to compress the sentence while retaining the phrase indicating nation names "from Kyrgyz Republic and Tajikistan", the words "signed", "resolution", and "import" that are tracked back from this phrase to the root also need to be retained in the sentence after compression. Namely, when an important word appears in a deep location of a dependency structure tree, the sequence of dependency structures has to be taken into consideration to make this word remain in the compressed sentence. In such a case, with the sentence compression method disclosed in NPL 2, since words are successively deleted from the leaf nodes of the dependency structure tree, the phrase "from Kyrgyz Republic and Tajikistan" indicating nation names is deleted preferentially.

The present invention was made in view of the above point and it is an object of the invention to make precise sentence compression possible even when the sentence has a deep dependency structure tree.

Means for Solving the Problem

To achieve the above object, the present invention resides in a symbol sequence generation device which, when a first symbol sequence x representing a sentence is input, generates a second symbol sequence y corresponding to the sentence and in accordance with a predetermined purpose by a pre-trained neural network, wherein the neural network includes an encoding unit that converts each element $x_i$ of an input first symbol sequence x into a first hidden state, an attention mechanism part that weights the first hidden state and outputs the weighted first hidden state as a second hidden state, a decoding unit that outputs a third hidden state based on a t-th element $x_t$ of the first symbol sequence x, a (t−1)th element $y_{t-1}$ of the second symbol sequence y, and the second hidden state, and an output unit that generates a t-th element $y_t$ of the second symbol sequence y based on the second hidden state and the third hidden state and outputs the generated element $y_t$. The attention mechanism part computes a first probability $P_{parent}(x_j|x_t, x)$ that a parent of an element $x_t$ contained in the first symbol sequence x is an element $x_j$ other than that element $x_t$ for each of elements in a dependency structure tree corresponding to the sentence, a second probability $\alpha_{d,t,j}$ that a d-ary parent of the element $x_t$ is an element $x_j$ other than that element $x_t$ using the computed first probability $P_{parent}(x_j|x_t, x)$ for each of elements, and outputs $\gamma_{d,t}$ that is obtained by weighting the first hidden state using the computed second probability $\alpha_{d,t,j}$ as the second hidden state.

Effects of the Invention

Precise sentence compression is made possible even when the sentence has a deep dependency structure tree.

DESCRIPTION OF EMBODIMENTS

Hereinafter, one embodiment of the present invention will be described. In the embodiment of the present invention, a sentence compression device 10 will be described, which includes an attention mechanism that takes into consideration a sequence of dependency structures from any given word in an original to an ancestor incorporated into Seq2Seq to enable precise sentence compression even when the sentence has a deep dependency structure tree.

The term "ancestor" refers to a word found when the parents of a word are tracked back sequentially several times (such as, for example, a word that is the parent of the parent). In the embodiment of the present invention, the parent of any given word shall be referred to as the primary parent, and the parent of the primary parent as the secondary parent, ..., and the parent of the (d−1)-ary parent as the d-ary parent.

<Functional Configuration Example of Sentence Compression Device 10>

Figure 1:
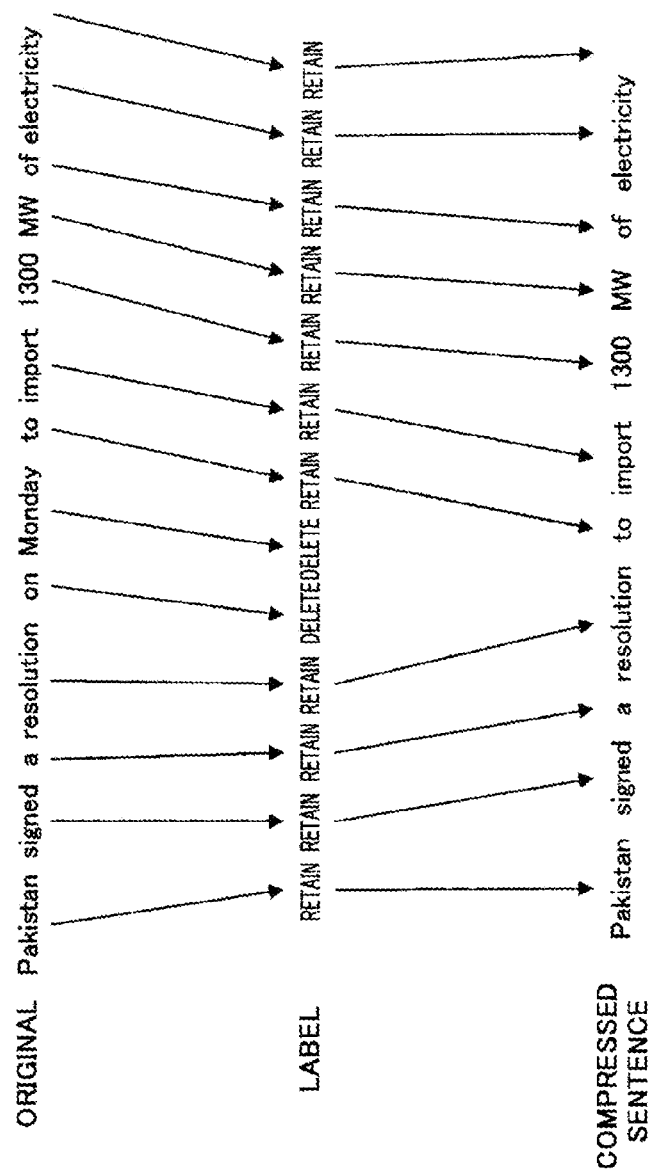
FIG. 1 is a diagram for explaining one example of sentence compression.
Figure 2:
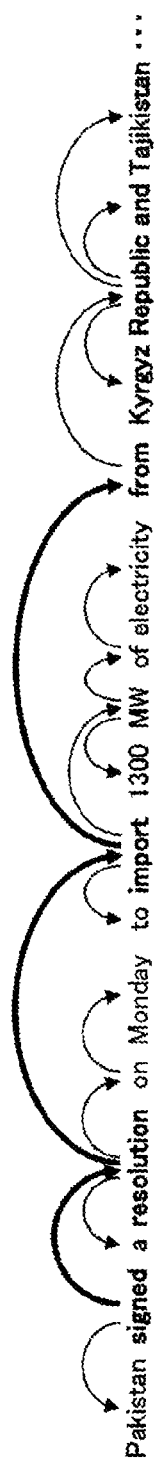
FIG. 2 is a diagram for explaining the technical problem.
Figure 3:
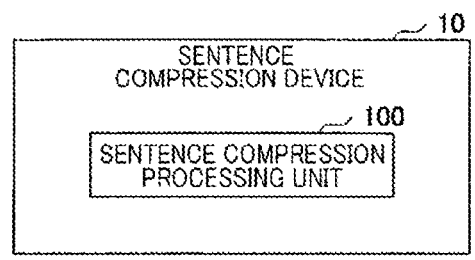
FIG. 3 is a diagram illustrating a functional configuration example of a sentence compression device in one embodiment of the present invention.

First, a functional configuration example of the sentence compression device 10 in the embodiment of the present invention will be described with reference to FIG. 3. FIG. 3 is a diagram illustrating a functional configuration example of the sentence compression device 10 in the embodiment of the present invention.

As shown in FIG. 3, the sentence compression device 10 in the embodiment of the present invention is a computer having a sentence compression processing unit 100. The sentence compression processing unit 100 is implemented, for example, by the processing that one or more programs installed in the sentence compression device 10 cause a CPU (Central Processing Unit) or the like to execute.

The sentence compression device 10 generates a compressed sentence from an input sentence (original) through sentence compression performed by the sentence compression processing unit 100. As mentioned above, the sentence compression processing unit 100 performs sentence compression by Seq2Seq that includes, incorporated therein, an attention mechanism that takes into consideration a sequence of dependency structures to an ancestor, so that even an original that has a deep dependency structure tree can be compressed precisely.

Here, sentence compression can be regarded as the task of selecting a label $y_i$ associated with a word $x_i$ from "retain", "delete", or "end-of-sentence" for each of the words $x_i$ when a sequence of words $x=(x_0, x_1, \ldots, x_n)$ making up an original is given. In the embodiment of the present invention, the sequence of words $x=(x_0, x_1, \ldots, x_n)$ is also expressed as an input sequence, and the sequence of labels $y=(y_0, y_1, \ldots, y_n)$ as an output sequence.

Here, $x_0$ represents a word that is a root node of a dependency structure tree, while label $y_0$ is the label given to the word $x_0$. The label $y_0$ may be fixed to a predetermined value indicating the head of the sentence <s>, for example, or may be fixed to either "retain" or "delete".

Each word $x_i$ ($i \neq 0$) is a vector of a predetermined number of dimensions converted from each word contained in the original by a known method such as Word2Vec. Each label $y_i$ ($i \neq 0$), on the other hand, may be a scalar that takes 0, 1, or 2, for example, or a one-hot vector with 3 elements.

Figure 10:
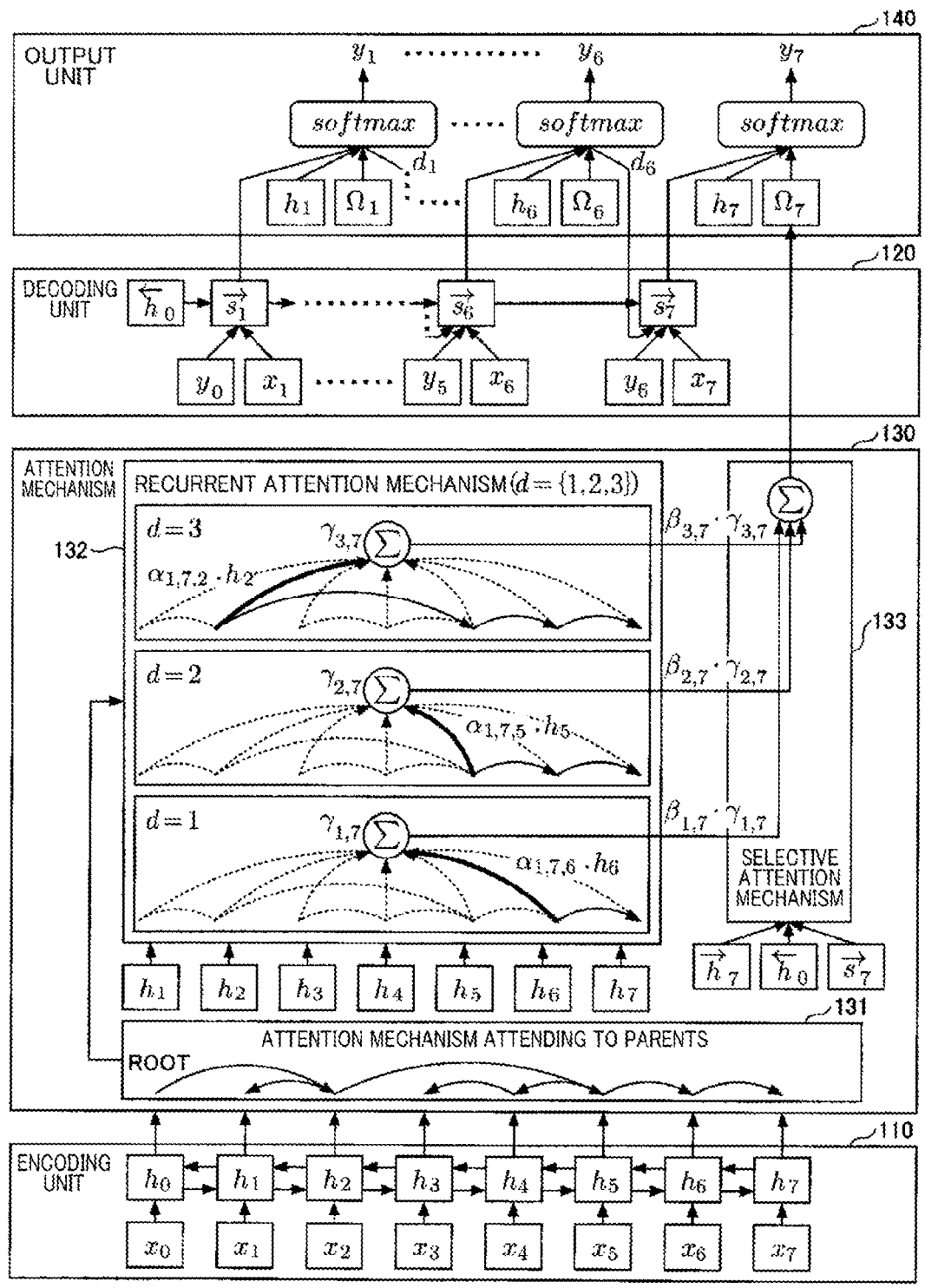
FIG. 10 is a diagram for explaining an overall operation example of the sentence compression processing unit in the embodiment of the present invention.

The configuration of the sentence compression device 10 shown in FIG. 10 is one example and other configurations are possible. For example, the sentence compression device 10 may be a computer system made up of a plurality of computers.

<Hardware Configuration Example of Sentence Compression Device 10>

Figure 4:
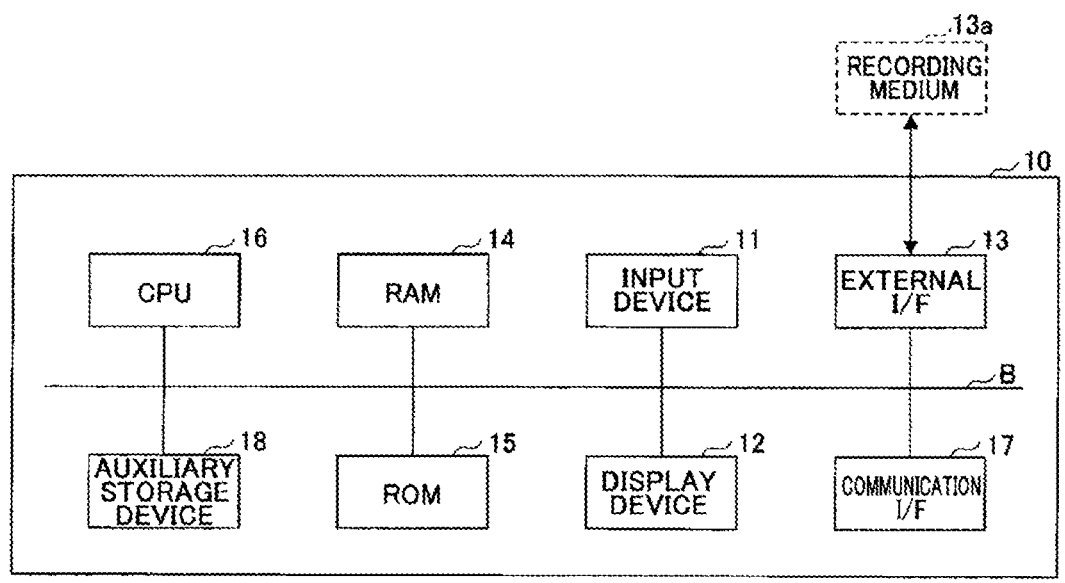
FIG. 4 is a diagram illustrating an example of a hardware configuration of the sentence compression device in the embodiment of the present invention.

Next, one example of a hardware configuration of the sentence compression device 10 in the embodiment of the present invention will be described with reference to FIG. 4. FIG. 4 is a diagram illustrating an example of a hardware configuration of the sentence compression device 10 in the embodiment of the present invention.

As shown in FIG. 4, the sentence compression device 10 in the embodiment of the present invention includes an input device 11, a display device 12, an external I/F 13, a RAM (Random Access Memory) 14, a ROM (Read Only Memory) 15, a CPU 16, a communication I/F 17, and an auxiliary storage device 18. These hardware components are connected to each other via buses B such as to be able to communicate with each other.

The input device 11 is a keyboard, mouse, touchscreen and the like, for example, and used by a user for inputting various operations. The display device 12 is a display and the like, for example, and shows processing results of the sentence compression device 10. The sentence compression device 10 may not have at least one of the input device 11 and the display device 12.

An external I/F 13 is an external device interface. The external device includes a recording medium 13a and the like. The sentence compression device 10 can read or write data from or to the recording medium 13a and the like via the external I/F 13. The recording medium 13a may have one or more programs and the like stored therein for implementing the sentence compression processing unit 100.

The recording medium 13a includes, for example, a flexible disc, CD (Compact Disc), DVD (Digital Versatile Disk), SD memory card (Secure Digital memory card), USB (Universal Serial Bus) memory card, and so on.

RAM 14 is a volatile semiconductor memory for temporarily retaining programs and data. ROM 15 is a non-volatile semiconductor memory that can retain programs and data even when switched off. The ROM 15 stores therein, for example, OS (Operating System) settings, network settings, and so on.

The CPU 16 is an operation device that reads programs and data from the ROM 15 or the auxiliary storage device 18 and the like to the RAM 14 and executes the processing.

The communication I/F 17 is an interface for connecting the sentence compression device 10 to a network. The sentence compression device 10 may obtain (download) one or more programs and the like that implement the sentence compression processing unit 100 from a predetermined server device or the like via the communication I/F 17.

The auxiliary storage device 18 is an HDD (Hard Disk Drive) or an SSD (Solid State Drive) and the like, for example, which is a non-volatile storage device that stores therein programs and data. The programs and data stored in the auxiliary storage device 18 include an OS, application programs that implement various functionalities on the OS, and one or more programs and the like that implement the sentence compression processing unit 100.

The sentence compression device 10 in the embodiment of the present invention has the hardware configuration shown in FIG. 4, whereby the device can implement various processes to be described later. While FIG. 4 shows the sentence compression device 10 in the embodiment of the present invention implemented by one device (computer), the configuration is not limited to this. The sentence compression device 10 in the embodiment of the present invention may be implemented by a plurality of devices.

<Functional Configuration Example of Sentence Compression Processing Unit 100>

Figure 5:
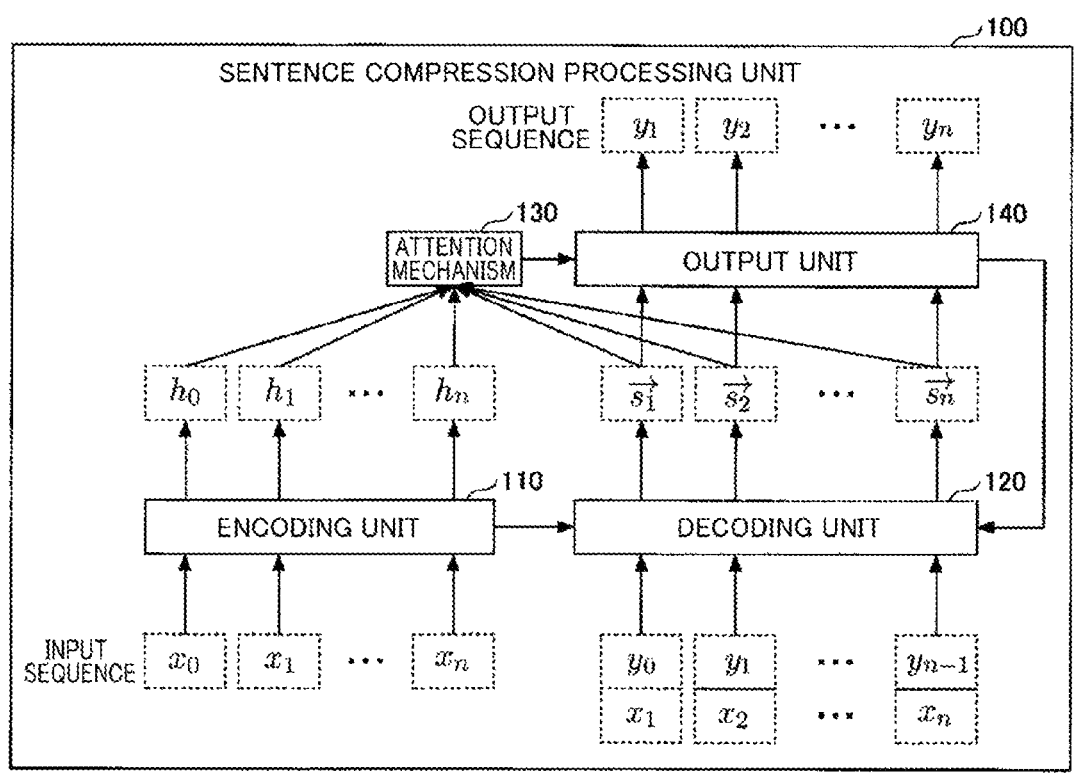
FIG. 5 is a diagram illustrating a detailed functional configuration example of a sentence compression processing unit in the embodiment of the present invention.

Next, a detailed functional configuration example of the sentence compression processing unit 100 in the embodiment of the present invention will be described with reference to FIG. 5. FIG. 5 is a diagram illustrating a detailed functional configuration example of the sentence compression processing unit 100 in the embodiment of the present invention.

As shown in FIG. 5, the sentence compression processing unit 100 in the embodiment of the present invention includes an encoding unit 110, a decoding unit 120, an attention mechanism 130, and an output unit 140.

When an input sequence $x=(x_0, x_1, \ldots, x_n)$ is input, the encoding unit 110 converts each of the words (vectors) $x_i$ into respective hidden states $h_i$ that are real-valued vectors of a predetermined number of dimensions.

When words $x_t$ or labels $y_{t-1}$ and the like are input, the decoding unit 120 combines these to obtain vectors and converts the vectors into hidden states that are real-valued vectors of a predetermined number of dimensions.

$$\vec{s_t}$$ [Formula 1]

(Hereinafter also expressed as "$s_t \rightarrow$".) The term "combine" as used in the embodiment of the present invention means combining of vectors.

Here, t is an index that represents a label $y_t$ that is the object of calculation of output probability and selected from the range of $1 \le t \le n$. That is, label $y_t$ is the label of the object of calculation of output probability. t is selected from 1 to n in the ascending order.

When the hidden states $h_0, \ldots, h_n$ output by the encoding unit 110 and $s_t \rightarrow$ and the like output by the decoding unit 120 are input, the attention mechanism 130 computes $\Omega_t$ that is to be used for the calculation of the output probability of label $y_t$ from these hidden states. $\Omega_t$ is computed by weighting each hidden state $h_0, \ldots, h_n$ by probability $\alpha_{d, t, j}$ that the d-ary parent of word $x_t$ is $x_j$, the index j representing the word that is the d-ary parent of the word $x_t$. Word $x_t$ is the word to which label $y_t$ is given. The method of computing $\Omega_t$ will be described later in detail.

When $\Omega_t$ output by the attention mechanism 130 and the hidden states $h_t$ and the like are input, the output unit 140 computes hidden states $d_t$ from these $\Omega_t$ and hidden states $h_t$ and the like to compute the output probabilities of labels $y_t$ by the softmax function.

<Operation Example of Encoding Unit 110>

Figure 6:
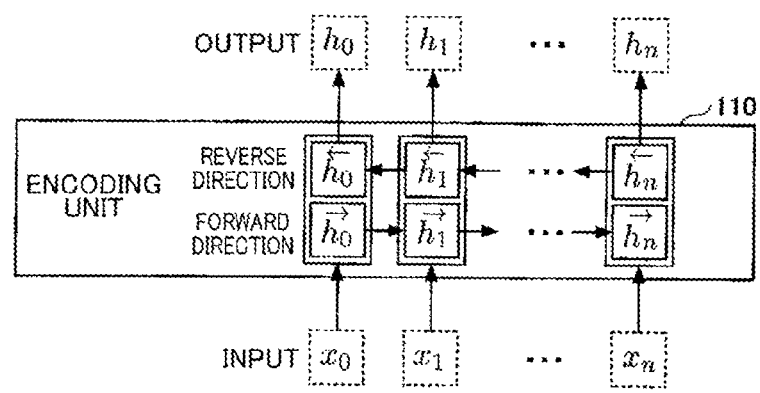
FIG. 6 is a diagram for explaining an operation example of an encoding unit in the embodiment of the present invention.

Next, an operation example of the encoding unit 110 in the embodiment of the present invention will be described with reference to FIG. 6. FIG. 6 is a diagram for explaining an operation example of the encoding unit 110 in the embodiment of the present invention.

As shown in FIG. 6, when an input sequence $x=(x_0, x_1, \ldots, x_n)$ is input, the encoding unit 110 converts each of the words $x_i$ into a hidden state by a forward recurrent neural network (forward-LSTM).

$$\vec{h_i}$$ [Formula 2]

(Hereinafter also expressed as "$h_i \rightarrow$".)

The encoding unit 110 also converts each of the words $x_i$ into a hidden state by a recurrent neural network in the opposite direction from the forward direction (backward-LSTM).

[Formula 3] $\overleftarrow{h_i}$ (Hereinafter also expressed as "$h_i \leftarrow$".)

The encoding unit 110 then obtains a hidden state $h_i$ by combining the hidden state $h_i \rightarrow$ and the hidden state $h_i \leftarrow$ for each word $i=1, \ldots, n$. Since the words $x_i$ are input to the encoding unit 110 consecutively, the hidden states $h_i$ depend on the hidden states $h_0, \ldots, h_{i-1}$ up to i−1.

Each hidden state $h_i$, hidden state $h_n \rightarrow$, and hidden state $h_0 \leftarrow$ obtained by the encoding unit 110 are output to the attention mechanism 130. The hidden states $h_0 \leftarrow$ obtained by the encoding unit 110 are also output to the decoding unit 120. Further, each hidden state $h_i$ obtained by the encoding unit 110 is output to the output unit 140, too.

<Operation Example of Decoding Unit 120>

Figure 7:
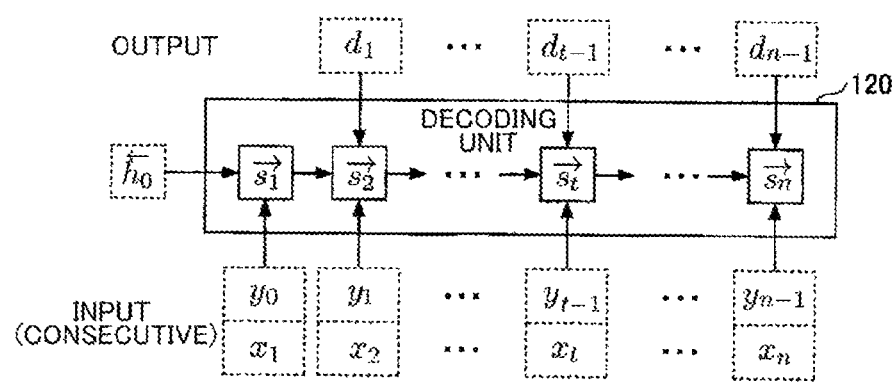
FIG. 7 is a diagram for explaining an operation example of a decoding unit in the embodiment of the present invention.

Next, an operation example of the decoding unit 120 in the embodiment of the present invention will be described with reference to FIG. 7. FIG. 7 is a diagram for explaining an operation example of the decoding unit 120 in the embodiment of the present invention.

As shown in FIG. 7, words $x_t$ and labels $y_{t-1}$ for $t=1, \ldots, n$ are consecutively input to the decoding unit 120.

When t=1, the word $x_1$ and label $y_0$ are input to the decoding unit 120. In this case, the decoding unit 120 combines the word $x_1$ and label $y_0$, and the hidden state $h_0 \leftarrow$ output from the encoding unit 110 to obtain a vector and converts the vector into a hidden state $s_1 \rightarrow$ by forward- LSTM. This way, when t=1, the hidden state $h_0 \leftarrow$ output from the encoding unit 110 is used to compute the hidden state $s_1 \rightarrow$, taking into consideration the presence of the root node (word $x_0$).

On the other hand, when 2≤t≤n, words $x_t$ and labels $y_{t-1}$ are input to the decoding unit 120. In this case, the decoding unit 120 combines the words $x_t$ and labels $y_{t-1}$, and hidden states $d_{t-1}$ output from the output unit 140 to obtain vectors and converts the vectors into hidden states $s_t \rightarrow$ by forward-LSTM. Since the words $x_t$ and labels $y_{t-1}$ are input to the decoding unit 120 consecutively, the hidden states $s_t \rightarrow$ depend on the hidden states $s_1 \rightarrow, \ldots, s_{t-1}$ up to t−1.

Thus the hidden states $s_1 \rightarrow$ are obtained consecutively for the words $x_t$ and labels $y_{t-1}$ consecutively input to the decoding unit 120. Each hidden state $s_t \rightarrow$ obtained by the decoding unit 120 is output to the output unit 140.

<Operation Example of Attention Mechanism 130>

Figure 8:
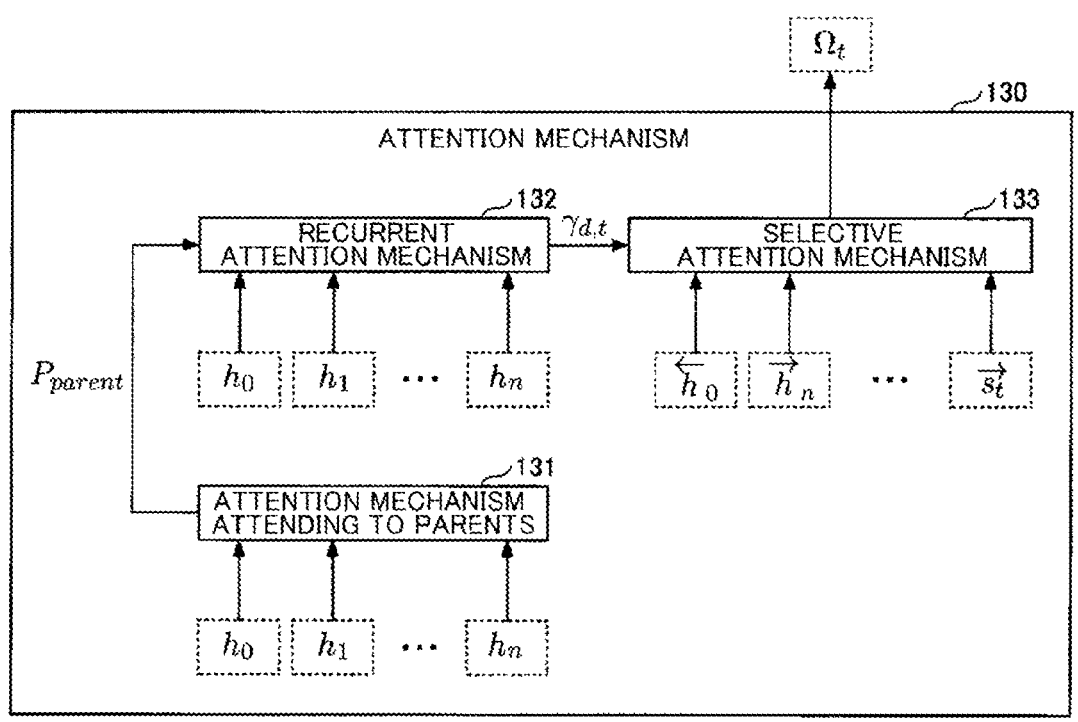
FIG. 8 is a diagram for explaining an operation example of an attention mechanism in the embodiment of the present invention.

Next, an operation example of the attention mechanism 130 in the embodiment of the present invention will be described with reference to FIG. 8. FIG. 8 is a diagram for explaining an operation example of the attention mechanism 130 in the embodiment of the present invention.

The attention mechanism 130 further includes an attention mechanism attending to parents 131, a recurrent attention mechanism 132, and a selective attention mechanism 133.

The attention mechanism attending to parents 131 computes probability $P_{parent}(x_j|x_t, x)$ that the parent of word $x_t$ is word x using hidden states $h_t$ and $h_j$. This computation is performed to all the combinations of $x_t$ and $x_j$. "j" represents any given j.

The recurrent attention mechanism 132 computes probability $\alpha_{d,\,t,\,j}$ that the d-ary parent of word $x_t$ is $x_j$ by recurrently using $P_{parent}(x_j|x_t, x)$. Using $\alpha_{d,\,t,\,j}$, the recurrent attention mechanism 132 computes a weighted sum $\gamma_{d,t}$ of the hidden states $h_0, \ldots, h_n$ when the d-ary parent is taken into consideration. Thus $\alpha_{d,\,t,\,j}$ is handled as a distribution for computing the weighted sum $\gamma_{d,\,t}$ of the hidden states $h_0, \ldots, h_n$ when the d-ary parent is taken into consideration. The sum $\gamma_{d,\,t}$ is a vector of the same number of dimensions as each of $h_0, \ldots, h_n$.

The selective attention mechanism 133 computes a weight $\beta_{d,\,t}$ for the degree of each $\gamma_{d,\,t}$.

$$d \in d \quad \text{[Formula 4]}$$

$$d \quad \text{[Formula 5]}$$

Here, d represents a set of real numbers. $\beta_{d,\,t}$ is the scalar computed using the hidden state $h_n \rightarrow$ and the hidden state $h_0 \leftarrow$ output from the encoding unit 110 and the hidden state $s_t \rightarrow$ output from the decoding unit 120.

The selective attention mechanism 133 then computes the weighted sum $\Omega_t$ of each of $\gamma_{d,\,t}$ calculated by the recurrent attention mechanism 132 and $\beta_{d,\,t}$. $\Omega_t$ obtained by the selective attention mechanism 133 is output to the output unit 140.

<<Computation Method of $P_{parent}(x_j|x_t, x)$>>

In the embodiment of the present invention, similarly to the Reference Literature 1 and Reference Literature 2 listed below, the dependency structures between the words are expressed as a graph (i.e., dependency structure tree) in the attention mechanism 130.

[Reference Literature 1] Kazuma Hashimoto and Yoshimasa Tsuruoka. Neural machine translation with source-side latent graph parsing. In Proceedings of the 2017 Conference on Empirical Methods in Natural Language Processing, pp. 125-135, Copenhagen, Denmark, September 2017. Association for Computational Linguistics.

[Reference Literature 2] Xingxing Zhang, Jianpeng Cheng, and Mirella Lapata. Dependency parsing as head selection. In Proceedings of the 15th Conference of the European Chapter of the Association for Computational Linguistics: Volume 1, Long Papers, pp. 665-676, Valencia, Spain, April 2017. Association for Computational Linguistics.

In a dependency structure tree, a word that is a child has one word that is its parent. When an input sequence $x=(x_0, x_1, \ldots, x_n)$ is given under this constraint, the parent of the word $x_t$ that satisfies t≠0 is selected from words $x_i$ that satisfy i≠t. The attention mechanism attending to parents 131 computes the probability $P_{parent}(x_j|x_t, x)$ that the parent of word $x_t$ is word $x_j$ from the following Equation 1 and Equation 2 using weight matrices $W_g$, $U_a$, and $W_a$.

[Formula 6]

$$P_{parent}(x_j|x_t,x) = \text{softmax}(W_g \cdot g(h_j,h_t)) \cdot \delta_{x_j} \quad \text{(Equation 1)}$$

[Formula 7]

$$g(h_j,h_t) = \tanh(U_a \cdot h_j + W_a \cdot h_t) \quad \text{(Equation 2)}$$

Here, $\delta_{x_j}$ is a binary vector that takes 1 for element $x_j$ and 0 for other elements.

In the embodiment of the present invention, unlike a parser, the dependency structure tree is not determined, and $P_{parent}(x_j|x_t, x)$ is used as is.

$P_{parent}(x_j|x_t, x)$ obtained by the attention mechanism attending to parents 131 is output to the recurrent attention mechanism 132.

<<Computation Method of $\alpha_{d,\,t}$>>

The recurrent attention mechanism 132 computes the probability $\alpha_{d,\,t,\,j}$ that the d-ary parent of word $x_t$ is $x_j$ recurrently by the following Equation 3.

[Formula 8]

$$\alpha_{d,t,j} = \begin{cases} \sum_{k=1}^{n} \alpha_{d-1,t,k} \cdot \alpha_{1,k,j} & (d > 1) \\ P_{parent}(x_j|x_t,x) & (d = 1) \end{cases} \quad \text{(Equation 3)}$$

Here, a constraint expressed by the following Equation 4 is imposed on $\alpha_{1,\,t,\,j}$ in order to incorporate the constraint of the dependency structure tree that the root node has no parent and that no child and parent are the same word onto the attention mechanism 130.

[Formula 9]

$$\alpha_{1,t,j} = \begin{cases} 1 & (t = 0 \wedge j = 0) \\ 0 & (t = 0 \wedge j > 0) \\ 0 & (t \neq 0 \wedge t = j) \end{cases} \quad \text{(Equation 4)}$$

From the first and second lines of the above Equation 4, it is determined that the parent of the root node is the root node. This means that the root node does not have a parent. The third line of the Equation 4 above expresses that no parent and child are the same word. Since the first line of the above Equation 3 satisfies the definition of a matrix product, the computation of the recurrent attention by this Equation 3 can be carried out efficiently on a CPU and a GPU (Graphics Processing Unit).

By thus using attentions recurrently, it is no longer necessary to prepare an attention mechanism for each parent when computing the probability of high-order parents. Since this obviates the necessity to learn a plurality of attentions, hyperparameters for adjustment of weights in the distribution of each attention in the learning process are also made unnecessary. Furthermore, since this means that high-order dependency relations need not be directly taken into consideration, the training data is prevented from becoming sparse.

<<Computation Method of $\gamma_{d,t}$>>

Using the probability $\alpha_{d,t,j}$ computed by the above Equation 3, the recurrent attention mechanism 132 computes a weighted sum $\gamma_{d,t}$ of the hidden states $h_0, \ldots, h_n$ by the following Equation 5.

[Formula 10]

$$\gamma_{d,t} = \sum_{k=1}^{n} \alpha_{d,t,k} \cdot h_k \quad \text{(Equation 5)}$$

$\gamma_{d,t}$ obtained by the recurrent attention mechanism 132 is output to the selective attention mechanism 133.

<<Computation Method of $\Omega_t$>>

In order to consider dependency relations of an appropriate degree for the input original, the selective attention mechanism 133 computes weighted sums $\Omega_t$ of hidden states $\gamma_{d,t}$ by the following Equation 6 and Equation 7.

[Formula 11]

$$\beta_{d,t} = \text{softmax}(W_c \cdot c_t) \cdot \delta_d \quad \text{(Equation 6)}$$

[Formula 12]

$$\Omega_t = \sum_{d \in \{0\} \cup d} \beta_{d,t} \cdot \gamma_{d,t} \quad \text{(Equation 7)}$$

Here, $W_c$ represents a weight matrix of the softmax layer of the output unit 140. $c_t$ represents the current context. $\gamma_{0,t}$ represents a zero vector, and $\beta_{0,t}$ means that the information of the dependency structure tree is not to be used. $\delta_d$ is a binary vector that takes 1 for element d and 0 for other elements.

The context $c_t$ is computed by $$c_t = [\overleftarrow{h_t}, h_0, \overrightarrow{h_n}, \overrightarrow{s_t}] \quad \text{[Formula 13]}$$

Here, [,] represents combining of vectors.

$\Omega_t$ obtained by the selective attention mechanism 133 is output to the output unit 140.

<Operation Example of Output Unit 140>

Figure 9:
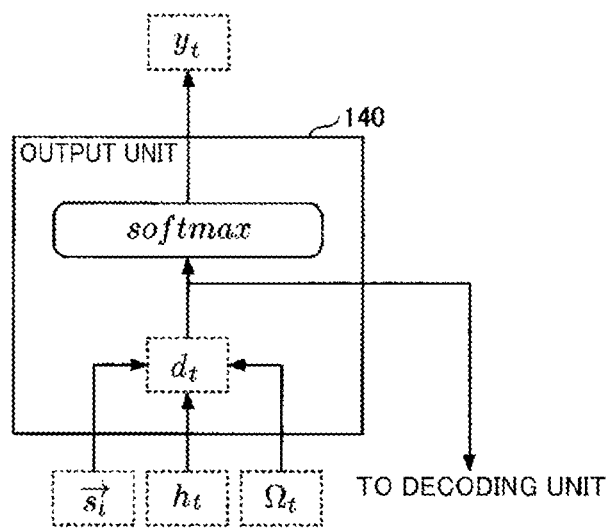
FIG. 9 is a diagram for explaining an operation example of an output unit in the embodiment of the present invention.

Next, an operation example of the output unit 140 in the embodiment of the present invention will be described with reference to FIG. 9. FIG. 9 is a diagram for explaining an operation example of the output unit 140 in the embodiment of the present invention.

As shown in FIG. 9, the output unit 140 combines $\Omega_t$ output from the attention mechanism 130, the hidden states $h_t$ output from the encoding unit 110, and the hidden states $\overrightarrow{s_t}$ output from the decoding unit 120 to obtain vectors, $$d_t = [h_t, \Omega_t, \overrightarrow{s_t}] \quad \text{[Formula 14]}$$

and inputs the vectors into the softmax layer ("softmax" shown in the drawing) to compute the output probabilities of labels $y_t$. The output probabilities $P(y_t|x_1, \ldots, x_n, y_1, \ldots, y_{t-1})$ of labels $y_t$ are computed by the following Equation 8.

[Formula 15]

$$P(y_t|x_1, \ldots, x_n, y_1, \ldots, y_{t-1}) = \frac{\exp(W_{v=y_t} \cdot d_t + b)}{\sum_{v=1}^{v=V} \exp(W_v \cdot d_t + b)} \quad \text{(Equation 8)}$$

Here, V represents the number of labels.

$d_t$ and $y_t$ obtained by the output unit 140 are output to the decoding unit 120. These $d_t$ and $y_t$ are used for the computation of the hidden states $\overrightarrow{s_{t+1}}$ by the decoding unit 120, as mentioned above.

<Overall Operation Example of Sentence Compression Processing Unit 100>

Here, a process of determining the output probability of the label $y_7$ to be given to the word $x_7$ will be described with reference to FIG. 10 as one example of the overall operation of the sentence compression processing unit 100. FIG. 10 is a diagram for explaining an overall operation example of the sentence compression processing unit 100 in the embodiment of the present invention.

As shown in FIG. 10, words $x_0$ to $x_7$ are input consecutively to the encoding unit 110, and hidden states $h_0$ to $h_7$ are consecutively output. Namely, the word $x_0$ is input to the encoding unit 110, and the hidden state $h_0$ is output. Next, the word $x_1$ is input to the encoding unit 110, and the hidden state $h_1$ is output. After that, likewise, the words $x_2$ to $x_7$ are each input to the encoding unit 110, and the hidden states $h_2$ to $h_7$ are output one by one. The hidden states $h_0$ to $h_7$ are input to the attention mechanism 130.

The attention mechanism attending to parents 131 of the attention mechanism 130 computes $P_{parent}(x_j|x_t, x)$ from the hidden states $h_1$ to $h_7$ output from the encoding unit 110. This computation is performed successively to all the combinations of $x_t$ and $x_j$ for t=0, 1, ..., 7. FIG. 10 shows a result of this computation where arrows directed from the parent to the child indicate words having the highest probability of being the parent for each of the words. For example, FIG. 10 indicates that the word having the highest probability of being the parent of the word $x_7$ is the word $x_6$. $P_{parent}(x_j|x_t, x)$ is input to the recurrent attention mechanism 132.

The recurrent attention mechanism 132 of the attention mechanism 130 recurrently computes the probability $\alpha_{d,t,j}$ that the d-ary parent of word $x_t$ is $x_j$ using $P_{parent}(x_j|x_t, x)$. The example in FIG. 10 shows that, when words having the highest probability of being the parent of the word $x_7$ are tracked back to the tertiary degree (d=3), the words $x_6$, $x_5$, and $x_2$ are identified as the primary parent, secondary parent, and tertiary parent, respectively, of the word $x_7$. The hidden states $h_6$, $h_5$, and $h_2$ corresponding to these parents are weighted by the primary attention $\alpha_{1,7,6}$, secondary attention $\alpha_{2,7,5}$, and tertiary attention $\alpha_{3,7,2}$, respectively, after which they are summed up to be $\gamma_{1,7}$, $\gamma_{2,7}$, and $\gamma_{3,7}$, respectively. These $\gamma_{1,7}$, $\gamma_{2,7}$, and $\gamma_{3,7}$ are input to the selective attention mechanism 133.

The selective attention mechanism 133 of the attention mechanism 130 weights $\gamma_{1,7}$, $\gamma_{2,7}$, and $\gamma_{3,7}$ respectively by $\beta_{1,7}$, $\beta_{2,7}$, and $\beta_{3,7}$, and sums them up to obtain $\Omega_7$. This $\Omega_7$ is input to the output unit 140. As mentioned above, $h_0 \leftarrow$, $h_7 \rightarrow$, and $s_7 \rightarrow$ are used for the computation of $\Omega_7$.

Meanwhile, as the word $x_1$, label $y_0$, as well as $h_0 \leftarrow$ output from the encoding unit 110 for t=1 are input to the decoding unit 120, the hidden state $s_1^{\rightarrow}$ is output. Also, as the words $x_t$, labels $y_{t-1}$, as well as $d_{t-1}$ output from the output unit 140 for t=2, . . . , 7 are consecutively input to the decoding unit 120, the hidden states $s_t^{\rightarrow}$ are output successively. These $s_t^{\rightarrow}$ are successively input to the output unit 140.

As the hidden states $s_t^{\rightarrow}$ output from the decoding unit 120, the hidden states $h_t$ output from the encoding unit 110, and $\Omega_t$ output from the attention mechanism 130 are consecutively input to the output unit 140 for t=1, 2, . . . , 7, labels $y_t$ are output successively. $d_t$ used for computing the labels $y_t$ at this time are output to the decoding unit 120 to be used for computing the hidden state $s_{t+1}$ for t-1.

Thus the labels $y_0, y_1, \ldots, y_7$ to be respectively given to each of the words $x_0, x_1, \ldots, x_7$ forming the original are obtained. A compressed sentence is generated from the original with the use of these labels $y_0, y_1, \ldots, y_7$. More specifically, for example, by using the words $x_i$ having the corresponding label $y_i$ "retain" out of the words $x_i$ forming the original, a compressed sentence formed by these words $x_i$ is generated.

<Training of Attention Mechanism 130>

While it was presumed that each of the parameters the sentence compression processing unit 100 used had been already learned in describing the process above, these parameters are learned through use of the training data to be described later. Examples of learned parameters include the weight matrices $W_g$, $U_a$, and $W_a$ used for the computation of $P_{parent}(x_j|x_t, x)$, weight matrix $W_c$ or the like used for the computation of $\beta_{d, t}$, and so on.

Here, the attention mechanism 130 learns the deletion probability of words at the same time while taking into consideration the possibilities of dependencies among the plurality of words using the parsing results obtained from a known parser. Therefore, one case of simultaneously learning deletion probabilities of words while taking into consideration the possibilities of dependencies will be described below.

It is possible that parsing results of a known parser contain errors. Accordingly, in the embodiment of the present invention, to reduce the influence of parsing errors of the known parser, the attention distribution $\alpha_{1, d, j}$ indicating the primary dependency relations and the output probability $P(y|x)$ of labels are learned at the same time. Learning is performed through use of training data that contains three contents: vector sequences corresponding to input sentences, parsing results of the input sentences by a parser, and labels indicating correct answers (correct labels). A vector sequence corresponding to an input sentence is a vector sequence obtained by converting each of the words contained in the input sentence by a known method such as Word2Vec, for example, into vectors of a predetermined number of dimensions.

The object function in this embodiment of the present invention is defined by the following Expression 9, where $a_{t, j}$=1 defines that the parent of word $x_t$ is $x_j$ in a dependency structure tree in the training data, and $a_{t,j}$=0 defines that the parent of word $x_t$ is not $x_j$.

[Formula 16]

$$-\log P(y|x) - \lambda \cdot \sum_{j=1}^{n} \sum_{t=1}^{n} a_{t,j} \cdot \log \alpha_{1,t,j} \quad \text{(Expression 9)}$$

Here, $\lambda$ is a hyperparameter for adjusting the label and the importance degree of the dependency parsing. The attention mechanism 130 is trained such as to minimize the object function shown by this Expression 9.

<Training of Output Unit 140>

The output unit 140, when trained, performs learning such that the sentence compression labels given as correct answers (correct labels) are equal to the output sentence compression labels.

<Conclusion>

As described above, the sentence compression device 10 in the embodiment of the present invention includes an attention mechanism 130 that takes into consideration a sequence of dependency structures from any given word in an original to an ancestor incorporated into Seq2Seq to enable precise sentence compression even when the sentence has a deep dependency structure tree. Accordingly, by using the sentence compression device 10 in this embodiment of the present invention, it is possible to generate a compressed sentence that preserves information expressed by an important word even if such an important word is present in a deep location.

The attention mechanism 130 in this embodiment of the present invention is applicable not only to sentence compression but also to any desirable symbol sequence generation process wherein, from an input sequence $\{x_i\}$ representing a sentence, an output sequence $\{y_i\}$ corresponding to this sentence and in accordance with a predetermined purpose is obtained. A specific example of such a symbol sequence generation process is, for example, translation or the like, wherein, for translation from one language to another, an input sequence representing an input sentence in one language produces an output sequence representing an output sentence in another language. Another example of application is phrase parsing, wherein, from an input sequence $\{x_i\}$ representing an input sentence, an output sequence $\{y_i\}$ representing a phrase structure tree corresponding to the input sentence (label sequence of phrase structures) is obtained for the purpose of sentence parsing.

Note, the embodiment of the present invention is applicable to any desirable task as long as it is a task where relations between words in an input sentence are handled as graphs (tree structures) in the attention mechanism 130, and not necessarily limited to the tasks of sentence compression, translation, phrase parsing and the like.

The present invention is not limited to the specific disclosure of the embodiment described above and can be modified and changed in various ways without departing from the scope of the claims.

REFERENCE SIGNS LIST

10 Sentence compression device
100 Sentence compression processing unit
110 Encoding unit
120 Decoding unit
130 Attention mechanism
131 Attention mechanism attending to parents
132 Recurrent attention mechanism
133 Selective attention mechanism
140 Output unit

The invention claimed is:

1. A computer-implemented method for processing a set of symbol data in a sentence, the method comprising:

receiving a first sequence of symbol data, the first sequence of symbol data representing an input sentence, wherein the first sequence of symbol data includes first symbol data;

generating, based on encoding one or more symbol data of the received first sequence of symbol data, a first hidden state of a neural network;

retrieving a predetermined set of symbol data from a memory, wherein the predetermined set of symbol data includes a dependency structure tree of symbol data, and the dependency structure tree of symbol data include first symbol data in the first sequence of symbol data and another symbol data as a parent of the symbol data in the dependency structure tree;

generating, based on weighting the generated first hidden state, a second hidden state of the neural network, wherein the weighting is based relates at least on a probability of the first symbol data in the first sequence of symbol data being distinct from said another symbol data as the parent in the dependency structure tree of symbol data, and the weighting is based on training attention data of symbol data using a sequence of training weight data according to a predetermined dependent tree of symbol data for training;

generating a third hidden state of the neural network based at least on a combination of:
the first symbol data in the first sequence of symbol data,
a second symbol data in a second sequence of symbol data, the second symbol data preceding the first symbol data in a sequence of symbol data, and
the generated second hidden state;

generating, based on the second hidden state and the third hidden state, a third symbol data in the second sequence of symbol data, wherein the third symbol data is subsequent to the second symbol data;

generating the second sequence of symbol data, wherein the second sequence of symbol data represents a sequence of labels for removing one or more symbol data in the first sequence of symbol data;

generating an output sequence of symbol data based on the removal of the one or more elements from the first sequence of symbol data according to the generated second sequence of symbol data; and transmitting the output sequence of symbol data to an application configured to display an output sentence according to the output sequence of symbol data.

2. The computer-implemented method of claim 1, wherein the second sequence of symbol data represents a compressed sentence based on the first sequence of symbol data.

3. The computer-implemented method of claim 1, the method further comprising:
generating a first probability of the first symbol data in the first sequence of symbol data being distinct from a fourth symbol data in the first sequence of symbol data at a parent of the first symbol data in the dependency structure tree of the first sequence of symbol data;
generating, based on the first probability, a second probability of the first sequence of symbol data being distinct from a fifth symbol data in the first sequence of symbol data at two or more levels toward the root of the dependency structure tree of the first sequence of symbol data; and
weighting the first hidden state based at least on the second probability.

4. The computer-implemented method of claim 1, the method further comprising:
generating one or more weights based at least on the first hidden state and the third hidden state, wherein the third hidden state is based on one or more symbol data in the second sequence of symbol data from the beginning to the second symbol data.

5. The computer-implemented method of claim 1, wherein the first hidden state includes a multi-dimensional vector representing the received first sequence of symbol data.

6. The computer-implemented method of claim 1, the method further comprising:
generate a label for at least a word in the input sentence in a language based on the second sequence of symbol data, wherein the label relates one or more words of another language for a language translation of the input sentence.

7. The computer-implemented method of claim 1, the method further comprising:
generate a label for at least a word in the input sentence based on the second sequence of symbol data, wherein the label comprises one of deletion or retention of the at least one word;
retaining the one or more words in the input sentence according to the label in the generated second sequence of symbol data;
generating the output sentence based on the retained one or more words in the input sentence; and
providing the output sentence.

8. A system for processing a set of symbol data, the system comprises:
a processor; and
a memory storing computer-executable instructions that when executed by the processor cause the system to:
receive a first sequence of symbol data, the first sequence of symbol data representing an input sentence, wherein the first sequence of symbol data includes first symbol data;
generate, based on encoding one or more symbol data of the received first sequence of symbol data, a first hidden state of a neural network;
retrieving a predetermined set of symbol data from a memory, wherein the predetermined set of symbol data includes a dependency structure tree of symbol data, and the dependency structure tree of symbol data include first symbol data in the first sequence of symbol data and another symbol data as a parent of the symbol data in the dependency structure tree;
generate, based on weighting the generated first hidden state, a second hidden state of the neural network, wherein the weighting is based at least on a probability of the first symbol data in the first sequence of symbol data being distinct from said another symbol data as the parent in the dependency structure tree of symbol data, and the weighting is based on training attention data of symbol data using a sequence of training weight data according to a predetermined dependent tree of symbol data for training;
generate a third hidden state of the neural network based at least on a combination of:
the first symbol data in the first sequence of symbol data,
a second element symbol data in a second sequence of symbol data, the second symbol data preceding the first symbol data in a sequence of symbol data, and
the generated second hidden state;

generate, based on the second hidden state and the third hidden state, a third element in the second sequence of symbol data, wherein the third symbol data is subsequent to the second symbol data;

generate the second sequence of symbol data, wherein the second sequence of symbol data represent a sequence of labels for removing one or more symbol data in the first sequence of symbol data; and generate an output sequence of symbol data based on the removal of the one or more symbol data from the first sequence of symbol data according to the generated second sequence of symbol data; and transmitting the output sequence of symbol data to an application configured to display an output sentence according to the output sequence of symbol data.

9. The system of claim 8, wherein the second sequence of symbol data represents a compressed sentence based on the first sequence of symbol data.

10. The system of claim 8, the computer-executable instructions when executed further causing the system to:

generate a first probability of the first symbol data in the first sequence of symbol data being distinct from a fourth symbol data in the first sequence of symbol data at a parent of the first symbol data in the dependency structure tree of the first sequence of symbol data;

generate, based on the first probability, a second probability of the first sequence of symbol data being distinct from a fifth symbol data in the first sequence of symbol data at two or more levels toward the root of the dependency structure tree of the first sequence of symbol data; and weight the first hidden state based at least on the second probability.

11. The system of claim 8, the computer-executable instructions when executed further causing the system to:

generate one or more weights based at least on the first hidden state and the third hidden state, wherein the third hidden state is based on one or more symbol data in the second sequence of symbol data from the beginning to the second symbol data.

12. The system of claim 8, wherein the first hidden state includes a multi-dimensional vector representing the received first sequence of symbol data.

13. The system of claim 8, the computer-executable instructions when executed further causing the system to:

generate a label for at least a word in the input sentence in a language based on the second sequence of symbol data, wherein the label relates one or more words of another language for a language translation of the input sentence.

14. The system of claim 8, the computer-executable instructions when executed further causing the system to:

generate a label for at least a word in the input sentence based on the second sequence of symbol data, wherein the label comprises one of deletion or retention of the at least one word;

retain the one or more words in the input sentence according to the label in the generated second sequence of symbol data;

generate the output sentence based on the retained one or more words in the input sentence; and provide the output sentence.

15. A computer-readable non-transitory recording medium storing computer-executable instructions that when executed by a processor cause a computer system to:

receive a first sequence of symbol data, the first sequence of symbol data representing an input sentence, wherein the first sequence of symbol data includes first symbol data;

generate, based on encoding one or more symbol data of the received first sequence of symbol data, a first hidden state of a neural network;

retrieving a predetermined set of symbol data from a memory, wherein the predetermined set of symbol data includes a dependency structure tree of symbol data, and the dependency structure tree of symbol data include first symbol data in the first sequence of symbol data and another symbol data as a parent of the symbol data in the dependency structure tree;

generate, based on weighting the generated first hidden state, a second hidden state of the neural network, wherein the weighting is based at least on a probability of the first symbol data in the first sequence of symbol data being distinct from said another symbol data as the parent in the dependency structure tree of symbol data, and the weighting is based on training attention data of symbol data using a sequence of training weight data according to a predetermined dependent tree of symbol data for training;

generate a third hidden state of the neural network based at least on a combination of:
 a first symbol data in the first sequence of symbol data,
 a second symbol data in a second sequence of symbol data, the second symbol data preceding the first symbol data in a sequence of symbol data, and
 the generated second hidden state;

generate, based on the second hidden state and the third hidden state, a third symbol data in the second sequence of symbol data, wherein the third symbol data is subsequent to the second symbol data;

generate the second sequence of symbol data, wherein the second sequence of symbol data represent a sequence of labels for removing one or more symbol data in the first sequence of symbol data;

generate an output sequence of symbol data based on the removal of the one or more symbol data from the first sequence of symbol data according to the generated second sequence of symbol data; and transmitting the output sequence of symbol data to an application configured to display an output sentence according to the output sequence of symbol data.

16. The computer-readable non-transitory recording medium of claim 15, wherein the second sequence of symbol data represents a compressed sentence based on the first sequence of symbol data.

17. The computer-readable non-transitory recording medium of claim 15, the computer-executable instructions when executed further causing the system to:

generate a first probability of the first symbol data in the first sequence of symbol data being distinct from a fourth symbol data in the first sequence of symbol data at a parent of the first symbol data in the dependency structure tree of the first sequence of symbol data;

generate, based on the first probability, a second probability of the first sequence of symbol data being distinct from a fifth symbol data in the first sequence of symbol data at two or more levels toward the root of the dependency structure tree of the first sequence of symbol data; and weight the first hidden state based at least on the second probability.

18. The computer-readable non-transitory recording medium of claim 15, the computer-executable instructions when executed further causing the system to:
  generate one or more weights based at least on the first hidden state and the third hidden state, wherein the third hidden state is based on one or more symbol data in the second sequence of symbol data from the beginning to the second symbol data.

19. The computer-readable non-transitory recording medium of claim 15, wherein the first hidden state includes a multi-dimensional vector representing the received first sequence of symbol data.

20. The computer-readable non-transitory recording medium of claim 15, the computer-executable instructions when executed further causing the system to:
  generate a label for at least a word in the input sentence based on the second sequence of symbol data, wherein the label comprises one of deletion or retention of the at least one word;
  retain the one or more words in the input sentence according to the label in the generated second sequence of symbol data;
  generate the output sentence based on the retained one or more words in the input sentence; and
  provide the output sentence.

\* \* \* \* \*